(12) United States Patent
Hirschmann et al.

(10) Patent No.: US 10,014,098 B2
(45) Date of Patent: Jul. 3, 2018

(54) SURGE PROTECTION DEVICE, COMPRISING AT LEAST ONE SURGE ARRESTER AND ONE SHORT-CIRCUIT SWITCHING DEVICE WHICH IS CONNECTED IN PARALLEL WITH THE SURGE ARRESTER, CAN BE THERMALLY TRIPPED AND IS SPRING-PRETENSIONED

(71) Applicant: DEHN + SÖHNE GmbH + Co. KG, Neumarkt/Opf. (DE)

(72) Inventors: Helmut Hirschmann, Berg (DE); Georg Wittmann, Lauterhofen (DE); Edmund Zäuner, Berching/Pollanten (DE)

(73) Assignee: DEHN + SÖHNE GMBH + CO. KG, Neumarkt/Opf. (DE)

( * ) Notice: Subject to any disclaimer, the term of this patent is extended or adjusted under 35 U.S.C. 154(b) by 0 days.

(21) Appl. No.: 15/126,189

(22) PCT Filed: Feb. 13, 2015

(86) PCT No.: PCT/EP2015/053038
§ 371 (c)(1),
(2) Date: Sep. 14, 2016

(87) PCT Pub. No.: WO2015/139893
PCT Pub. Date: Sep. 24, 2015

(65) Prior Publication Data
US 2017/0110226 A1   Apr. 20, 2017

(30) Foreign Application Priority Data

Mar. 20, 2014   (DE) .................... 20 2014 002 496 U
May 7, 2014   (DE) .................... 20 2014 003 832 U

(51) Int. Cl.
*H01C 7/12* (2006.01)
*H01H 37/32* (2006.01)
(Continued)

(52) U.S. Cl.
CPC .............. *H01C 7/126* (2013.01); *H01C 7/12* (2013.01); *H01H 37/32* (2013.01); *H01H 37/64* (2013.01);
(Continued)

(58) Field of Classification Search
CPC . H01C 7/12; H01C 7/126; H01T 1/14; H01H 37/32; H01H 37/64; H01H 37/76;
(Continued)

(56) References Cited

U.S. PATENT DOCUMENTS 5,248,953 A   9/1993   Hönl .............................. 337/32
8,009,401 B2   8/2011   Domejean et al. ........... 361/124
(Continued)

FOREIGN PATENT DOCUMENTS

DE   295 19 313   1/1996   .............. H01C 7/12
DE   20 2009 013 505   4/2010   .............. H01C 7/12
(Continued)

OTHER PUBLICATIONS

The Notification Concerning Transmittal of International Preliminary Report on Patentability (Chapter I of the Patent Cooperation Treaty), in English, dated Sep. 29, 2016, which was issued by the International Bureau of WIPO in Applicant's corresponding international PCT application having Serial No. PCT/EP2015/053038, filed on Feb. 13, 2015.
(Continued)

*Primary Examiner* — Anatoly Vortman
(74) *Attorney, Agent, or Firm* — Bodner & O'Rourke, LLP; Gerald T. Bodner; Christian P. Bodner

(57) ABSTRACT

The invention relates to a surge protection device, comprising at least one surge arrester and one short-circuit switching
(Continued)

Figure 1:
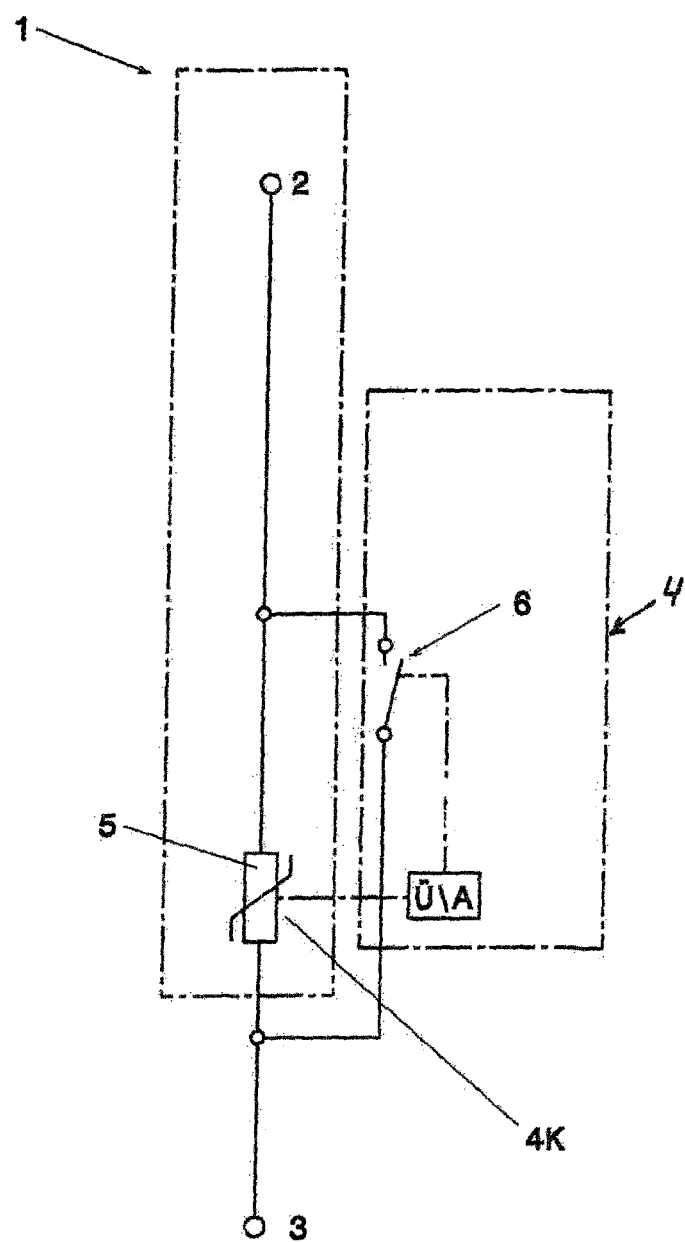

device which is connected in parallel with the surge arrester, can be thermally tripped and is spring-pretensioned, wherein the abovementioned means form one physical unit. The thermal tripping means is arranged in the region where heating of the surge arrester is expected when it is overloaded, and operating or surge current does not flow through said thermal tripping means. The thermal tripping means is in the form of a stop part which releases an unlocking slide of the switching device in the event of thermal overload. The switching device has two opposite contact pieces, wherein at least one of the contacts is of moveable design and is under spring pretension in the closing direction of the switching device. The opening state of the switching device is maintained by the unlocking slide, which is released by the thermal tripping means to close the switching device.

5 Claims, 2 Drawing Sheets

(51) Int. Cl.

| | | |
|---|---|---|
| *H01H 37/36* | (2006.01) | |
| *H01H 37/64* | (2006.01) | |
| *H01T 1/14* | (2006.01) | |
| *H01H 37/76* | (2006.01) | |
| *H02H 9/04* | (2006.01) | |
| *H01H 83/10* | (2006.01) | |

(52) U.S. Cl.
CPC ............... *H01H 37/76* (2013.01); *H01T 1/14* (2013.01); *H01H 83/10* (2013.01); *H01H 2037/762* (2013.01); *H01H 2235/01* (2013.01); *H02H 9/043* (2013.01)

(58) Field of Classification Search
CPC ............... H01H 2235/01; H01H 83/10; H01H 2037/762; H02H 9/043
USPC .......................................................... 337/401
See application file for complete search history.

(56) References Cited

U.S. PATENT DOCUMENTS

| | | | | |
|---|---|---|---|---|
| 8,493,170 B2* | 7/2013 | Zauner | ................... | H01C 7/126 337/142 |
| 8,526,159 B2* | 9/2013 | Ludewig | ................ | H01C 7/126 361/111 |
| 8,705,221 B2* | 4/2014 | Daum | ...................... | H01C 7/12 361/103 |
| 9,130,354 B2* | 9/2015 | Ehrhardt | ................ | H01C 7/126 |
| 9,172,236 B2 | 10/2015 | Hirschmann et al. | | |
| 2014/0313632 A1* | 10/2014 | Hirschmann | ........... | H01C 7/12 361/131 |
| 2015/0180223 A1 | 6/2015 | Pfortner et al. | ............. | 361/93.8 |

FOREIGN PATENT DOCUMENTS

| | | | | |
|---|---|---|---|---|
| DE | 10 2011 018 556 | 8/2012 | ............... | H01C 7/12 |
| DE | 10 2012 014 595 | 1/2014 | ............. | H01H 37/76 |
| EP | 0 516 922 | 12/1992 | ............. | H01H 37/76 |
| EP | 1 447 831 | 7/2006 | ............. | H01H 83/10 |
| EP | 2 065 914 | 6/2009 | ............. | H01H 83/10 |
| EP | 2 096 657 | 9/2009 | ............. | H01H 71/20 |
| WO | WO 2008/028724 | 3/2008 | ............... | H01C 7/12 |
| WO | WO 2009/034081 | 3/2009 | ............... | H01C 7/12 |
| WO | WO 2014/016156 | 1/2014 | ............... | H01C 7/12 |

OTHER PUBLICATIONS

The English translation of the International Preliminary Report on Patentability (Chapter I of the Patent Cooperation Treaty), dated Sep. 20, 2016, which was issued by the International Bureau of WIPO in Applicant's corresponding international PCT application having Serial No. PCT/EP2015/053038, filed on Feb. 13, 2015.
The Written Opinion of the International Searching Authority, in English(dated Sep. 20, 2016—mailed with the English translation of the International Preliminary Report on Patentability), which was issued by the International Bureau of WIPO in Applicant's corresponding international PCT application having Serial No. PCT/EP2015/053038, filed on Feb. 13, 2015.
The International Search Report, in English, dated May 4, 2015, which was issued by the International Bureau of WIPO in Applicant's corresponding international PCT application having Serial No. PCT/EP2015/053038, filed on Feb. 13, 2015.

* cited by examiner

SURGE PROTECTION DEVICE, COMPRISING AT LEAST ONE SURGE ARRESTER AND ONE SHORT-CIRCUIT SWITCHING DEVICE WHICH IS CONNECTED IN PARALLEL WITH THE SURGE ARRESTER, CAN BE THERMALLY TRIPPED AND IS SPRING-PRETENSIONED

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The invention relates to a surge protection device, comprising at least one surge arrester and one short-circuit switching device which is connected in parallel with the surge arrester, can be thermally tripped, and is spring-pretensioned, wherein the above-mentioned means form a module, the thermal tripping means is arranged in the region of the heating to be expected of the surge arrester in the event of the overload thereof and is designed as a stop part, through which operating current or impulse current does not flow, and which releases an unlocking slide of the switching device in the event of thermal overload, according to the claims.

(2) Description of Related Art

A surge arrester based on a varistor is known from DE 295 19 313 U1, wherein a direct transmission of the impermissible heat arising on the varistor in case of damage to a thermal tripping device is ensured. For this purpose, a support wall is provided in the plug part, wherein the varistor is attached on one lateral face of the support wall and the thermal tripping device and the associated switching means are attached on the other lateral face of the support wall. In this way, the thermal tripping device is opposite to the varistor. In one embodiment, one or more connection tabs of the varistor are guided through the partition wall into the region in which the thermal tripping device and the corresponding switching means are located.

The operating current and/or the occurring overload currents are guided via contact means of a plug part, which is in turn introducible into a base part. The current arrives at the varistor via the switching means such that the actual thermal tripping means, in particular a solder, also has current flowing through it.

The overall embodiment and design of the teaching according to DE 295 19 313 U1 can only switch very small currents. In the case of the occurrence of short-circuit currents or in DC voltage applications, an additional external switching element is required, for example, in the form of a separate switching means or a fuse.

Structural combinations of surge plug parts with additional switching devices are known from EP 1 447 831 B1 or EP 2 065 914 A1, which are either introduced into a shared main housing or are enclosed by such a main housing. The solutions described in the above-mentioned prior art have a tripping or shutdown behavior which is not adapted to the special properties of the respective surge arrester used, for example, varistors.

In the surge protection device according to EP 2 096 657 A1, a thermal disconnection device having arc-quenching properties is firstly provided. In addition, a second switching device having baffles for extinguishing arcs is formed. This prior art corresponds to a switching device which was expanded with a surge protection device and which only has restricted power data and is only suitable for special applications.

If one summarizes the prior art, thermal disconnection devices are typically designed so that they monitor the aging behavior of the voltage-limiting components, for example, varistors, and respond upon heating above a critical temperature. Generally only very small currents in the milliampere up to the maximum settable ampere range flow in the disconnection procedure. The switching capability of classical thermal disconnection devices is therefore also only in this low current range.

Cases of overload and/or fault of surge arresters can, as a result of practical experience, also result in total failure or partial failure of the surge-limiting components. The short-circuit current of the connected power source which then occurs has to be interrupted and/or shut down by upstream protection devices, for example, a fuse or a mechanical switching device, to obtain a backup protection function.

According to EP 1 447 831 B1, the flowing short-circuit current is interrupted by a corresponding special switching device.

The combination of surge protection devices with fuse and/or mechanical switching device has the disadvantage that, for these elements to respond and/or trip, a short-circuit current in the meaning of multiple times the rated current of the switching device or fuse has to flow.

This current, which is generally several hundred amperes or extends into the kiloampere range, can result in the destruction or explosion of the surge-limiting components and can represent a risk of fire for the device itself or for adjacent devices.

Thus, if the occurring fault current in a surge protection device is greater than that which can be extinguished by the thermal disconnection device itself, but is less than the tripping current of backup protection devices, for example, a fuse, the arrester can then be destroyed with the above-mentioned consequences.

In addition, a device for protection from thermal overload of a component to be protected is previously known from DE 10 2012 014 595 A1. The solution therein is to be alternately usable as a disconnection switch or short-circuit switch for the component to be protected. For this purpose, an actuating device is embodied as a connection, which can be thermally tripped of the component to be protected, to a pretensioned element, for example, a switch. If the connection which can be thermally tripped softens, the force of the pretensioned element is thus released and the switch moves into a further switch state. The switch can be implemented in this case as a disconnection switch, but also as a short-circuiter with respect to the component to be protected. The switch additionally has a selection device, using which it is settable whether the switch acts as a disconnection switch or as a short-circuiter.

BRIEF SUMMARY OF THE INVENTION

From the above statements, it is therefore the object of the invention to specify a refined surge protection device, comprising at least one surge arrester and one switching device, which is connected in parallel with the surge arrester, can be thermally tripped, and is spring-pretensioned, wherein the state of the surge arrester used, for example, a varistor, is detected in accordance with its operating and overload behavior and in the event of overload states it is reliably short-circuited, so that a response of external fuses is possible and a defined failsafe state is provided in this regard.

The object of the invention is achieved by a surge protection device according to the combination of features in the claims, wherein the dependent claims represent at least advantageous embodiments and refinements.

Accordingly, the invention proceeds from a surge protection device, comprising at least one surge arrester and one switching device, which is connected in parallel with the surge arrester and can be thermally tripped, wherein the above-mentioned means form a module and the thermal tripping means is arranged in the region of the heating to be expected of the surge arrester upon the overload thereof.

Furthermore, the thermal tripping means is designed as a stop part through which operating current or impulse current does not flow, and which releases an unlocking slide of the switching device in the event of thermal overload.

The above-mentioned stop part is thermally and mechanically coupled to the surge arrester and blocks the movement path of the unlocking slide.

The switching device preferably has two opposing contact parts, wherein at least one of the contact parts is embodied as movable and is under spring pretension in the closing direction of the switching device. The open state of the switching device is secured by the unlocking slide and can be released by the thermal tripping means for closing the switching device. In one embodiment variant, the contact parts are pin-like elements made of a conductive, preferably metallic material.

In the open case of the switching device, a separating element is located in the resulting spacing room.

The insulating separating element is also under spring pretension, to leave the spacing room in a rapid and oriented manner in case of short-circuit.

At least sections of the contact parts are located inside a molded body forming an arc chamber, wherein the molded body has an attachment, which is oriented at an angle which deviates from the movement direction of the movable contact part. It can be a 90° orientation in this case. The molded body has receptacle spaces for accommodating the contact parts.

The attachment also has a cavity for accommodating the separating element and the spring device, which generates the pretension force.

The surfaces of the contact parts of the switching device facing toward one another can have a contour to enlarge the current transfer area and reduce the transfer resistance.

In this case, in one embodiment the surfaces can be designed as an interlocking cone and counter cone.

The unlocking slide, which preferably consists of a plastic material and/or is manufactured as a plastic injection-molded part, presses against the stop part, on the one hand, and fixes the switching device, i.e., the movable, spring-pretensioned contact part, on the other hand.

The unlocking slide additionally has a lug-like section, which secures the spring-pretensioned contact part of the switching device.

A flexible electrical connecting means, which then leads to a terminal on the surge arrester, is fastened in the region of the spring-pretensioned contact part which is secured by the lug-like section of the unlocking slide.

The molded body, the cavity, and the separating element are preferably designed so that, in particular with open switching device, a gas-tight bulkhead is implemented, so that a quasi-encapsulated arc combustion chamber and/or an arc extinguishing chamber in this regard results.

The invention will be explained in greater detail hereafter on the basis of an exemplary embodiment and with the aid of figures.

BRIEF DESCRIPTION OF THE SEVERAL VIEWS OF THE DRAWINGS(S)

Figure 2:
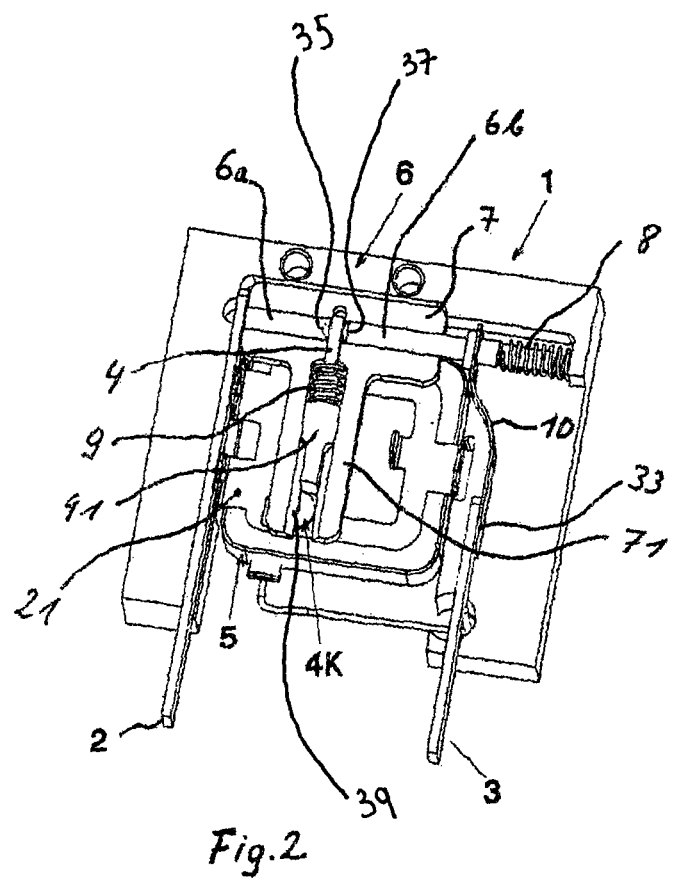

In the figures:

FIG. 1 shows a schematic circuit diagram of the solution according to the invention having monitoring circuit U and short-circuiter 4; 6 and FIG. 2 shows a perspective illustration of a surge protection device according to the invention, designed as a plug part to be accommodated in a base part (not shown), wherein the molded body having switching device and the thermal tripping means are located inside the plug part.

DETAILED DESCRIPTION OF THE INVENTION

The illustration of the schematic circuit diagram according to FIG. 1 proceeds from a surge protection means 1, in which the operating-impulse current path and the monitoring path U are functionally separated. The integrated switching device 6 is designed as a short-circuiter, wherein the surge arrester, for example, designed as a varistor, is identified with the reference sign 5. The unlocking of the switching device 6 is symbolized by the reference sign 4 in FIG. 1 and the thermal coupling element is identified as the thermal tripping means with 4K. The terminals of the surge protection means have the reference signs 2 and 3.

The plug part implemented according to the invention comprises the surge protection device 1 having the surge arrester 5, the unlocking slide 4, and the molded body 7, which accommodates the switching device 6 having the contact parts 6a, 6b. In addition, plug contacts 2; 3 for the operating current supply are provided on the lower side of the plug part. Reference sign 10 according to FIG. 2 identifies a movable conductor section, to close the circuit from the plug contact in the left of the figure via the switching device to the varistor and therefrom to the plug contact in the right of the figure.

FIG. 2 shows the disk-shaped varistor 5 having an applied metallic conductive surface, which extends into a region of expected strong heating of the varistor 5, wherein the thermal tripping means 4K is applied in this region.

The switching device 6 comprises contact parts 6a and 6b (see FIG. 2), wherein in the example shown, the contact part 6b is mounted with pretension of a spring 8 so it is movable in the molded body 7.

In the short-circuit position of the switching device 6, the movable contact part 6b is pressed against the fixed contact part 6a.

The open state of the switching device 6 is thus secured by the means 4 and can be released by the thermal tripping means 4K to close the switching device 6.

The open state of the switching device 6 is illustrated in FIG. 2. The position of the separating element 4 is also recognizable here, the location change of which in the event of the short-circuit is performed with assistance by the spring 9.

The molded body 7 has an attachment 71, which is oriented at an angle which deviates from the movement direction of the movable contact part 6b.

The attachment 71 comprises a cavity 39 for accommodating a section 41 of the separating element 4.

The surfaces of the contact parts 6a and 6b facing toward one another can have a cone contour 37 with associated conical recess 35 in the counter contact part. In this way, the current transfer surface is enlarged and the transfer resistance between the contact parts is reduced. The flexible electrical connection means 10 is connected, on the one hand, to the movable contact part 6b and leads, on the other hand, to a molded-on terminal leg 33. The further electrical terminal 21 of the varistor 5 leads to the plug terminal 2.

The internal contour inside the molded part 7 corresponds to the external contour of the movable contact part 6b in consideration of the required tolerances for the desired free mobility of the contact part in this regard.

The surge-limiting component 5, preferably designed as a varistor, is thermally coupled according to the illustrations in the drawing via a thermal tripping means 4K to the unlocking and tripping system. There is no current flow through the thermal tripping element 4K in this case.

The embodiment of the thermal tripping element can therefore be selected completely freely to optimize the response behavior and therefore to achieve a good tripping characteristic, specifically via appropriate positioning on the varistor 5 and/or dimensioning and selection of the material for the thermal tripping element with respect to thermal capacity and thermal conductivity. The thermal tripping element 4K can be manufactured as a separate part, which is permanently fastened using a solder or a heat-sensitive adhesive on the varistor. On the other hand, however, the thermal tripping means itself can also consist of a material which deforms in a yielding manner under the effect of heat.

In the majority of cases, a very rapid and thermally sensitive tripping characteristic is desired. This can be implemented in that the thermal tripping means is connected in an optimally thermally conductive manner directly to the surge-limiting component or is manufactured from a thermally insulating envelope material, to avoid heat losses. Thermally conductive connections to quasi-parasitic heat sinks are avoided.

Since the monitoring circuit Ü is not in the operating current path in the solution according to the invention, the design of the thermal monitoring device can be dimensioned exclusively under the aspect of the failure behavior of the voltage-limiting component. Upon exceeding a set critical temperature, the thermal coupling to the surge-limiting element is canceled out. The thermal tripping means is moved away from the viewpoint of the spring force 9 and the unlocking slide 4; 41, so that the switching device passes into the short-circuit.

In case of short-circuit, the current is conducted via the contact parts 6a and 6b, wherein the corresponding contact point is under spring pre-tension.

SEQUENCE LISTING

Not Applicable

What is claimed is:

1. A surge protection device, comprising at least one surge arrester (5) and a switching device, the switching device being switchable between an open state and a closed state, wherein the above-mentioned means form a module, a thermal tripping means (4K) which is arranged in the region of the heating to be expected of the surge arrester (5) in the event of the overload thereof and is designed as a stop part through which operating current or impulse current does not flow, which releases an unlocking slide (4; 41) of the switching device (6) which moves in a movement path in the event of thermal overload, wherein the thermal tripping means stop part (4K) is thermally and mechanically coupled to the surge arrester (5) and blocks the movement path of the unlocking slide (4; 41), wherein the switching device (6) has two opposing, in particular interlocking contact parts (6a; 6b), wherein at least one of the interlocking contact parts (6b) is embodied as movable, characterized in that the movable interlocking contact part is movable in at least a first direction, the first direction being towards the other interlocking contact part, the switching device is embodied as a short-circuit switching device (6), which is connected in parallel with the surge arrester, can be thermally tripped, and is spring-pretensioned, and the movable contact part (6b) is under spring pretension (8) in the first direction, furthermore the open state of the switching device is secured by the unlocking slide (4) and can be released by the thermal tripping means stop part (4K) to close the switching device (6), wherein the unlocking slide has a first end and a second end disposed opposite the first end, wherein the first end of the unlocking slide includes a separating element, wherein the separating element is under spring pretension (9), in order to move rapidly away from the interlocking contact parts (6a, 6b) in case of short-circuit of the switching device (6).

2. The surge protection device according to claim 1, characterized in that at least sections of the interlocking contact parts (6a; 6b) are located inside a molded body (7), which forms an arc chamber, wherein the molded body (7) has an attachment (71), which is oriented at an angle which deviates from the movement direction of the movable interlocking contact part (6b).

3. The surge protection device according to claim 2, characterized in that the attachment (71) has a cavity for accommodating the separating element (41).

4. The surge protection device according to claim 1, characterized in that the contact parts (6a; 6b) of the switching device (6) have surfaces facing toward one another, wherein the surfaces have a contour to enlarge the current transfer surface and reduce the transfer resistance.

5. The surge protection device according to claim 4, characterized in that the surfaces of the interlocking contact parts (6*a*; 6*b*) are designed as cone and counter cone.

\* \* \* \* \*